United States Patent
Roberts et al.

(10) Patent No.: US 6,212,398 B1
(45) Date of Patent: Apr. 3, 2001

(54) WIRELESS TELEPHONE THAT RAPIDLY REACQUIRES A TIMING REFERENCE FROM A WIRELESS NETWORK AFTER A SLEEP MODE

(75) Inventors: Clarence V. Roberts, Raleigh; Raymond C. Henry, Jr., Wake Forest, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/205,535

(22) Filed: Dec. 3, 1998

(51) Int. Cl.[7] ............................ H04Q 7/32
(52) U.S. Cl. ............ 455/502; 455/67.6; 455/574; 455/343; 370/311
(58) Field of Search ............ 455/502, 68, 69, 455/70, 71, 67.1, 67.6, 574, 343, 38.3; 370/311; 375/354–357

(56) References Cited

U.S. PATENT DOCUMENTS

| | | | |
|---|---|---|---|
| 5,678,227 | 10/1997 | Connell et al. | 455/343 |
| 5,737,323 | * 4/1998 | Lansdowne | 455/343 |
| 5,790,589 | 8/1998 | Hutchison, IV et al. | 375/200 |
| 5,790,941 | 8/1998 | Peponides | 455/87 |
| 5,799,256 | 8/1998 | Pombo et al. | 455/574 |
| 5,953,648 | * 9/1999 | Hutchison, IV et al. | 455/343 |
| 6,101,173 | * 8/2000 | Bayley | 370/311 |

FOREIGN PATENT DOCUMENTS

| | | | |
|---|---|---|---|
| 0726687 | 8/1996 | (EP) | H04Q/7/32 |
| 2324681 | 1/1998 | (GB) | H04Q/7/32 |

* cited by examiner

Primary Examiner—Reinhard J. Eisenzopf
Assistant Examiner—Lester G. Kincaid
(74) Attorney, Agent, or Firm—Wood, Phillips, VanSanten, Clark & Mortimer (57) ABSTRACT

A method for rapidly reacquiring a timing reference after a sleep period in a wireless telephone receiving pilot signals from one or more base stations in a wireless network, wherein the wireless telephone has a master timer (local time reference), a fast, accurate clock source, a slow, less accurate but power efficient clock source and a memory. The method includes the steps of entering the sleep period by storing one or more parameters related to the pilot signals and how the pilot signals are changing over time, calculating a prediction of the parameters of the pilot signals after a sleep period based on the stored parameters, storing the prediction, starting the slow clock, and stopping the master timer (local time reference) and fast clock source. The method further includes the steps of ending the sleep period by generating a wake-up interrupt by the slow clock after the sleep period, restarting the master timer and fast clock source responsive to the wake-up interrupt, and reacquiring pilot signals using the predictions stored previously. A time correction factor can then be computed that closely aligns the received pilot signals on the prediction which is then weighted and the master timer is adjusted by the weighted time correction.

33 Claims, 5 Drawing Sheets

WIRELESS TELEPHONE THAT RAPIDLY REACQUIRES A TIMING REFERENCE FROM A WIRELESS NETWORK AFTER A SLEEP MODE

FIELD OF THE INVENTION

This invention relates to reacquiring a timing reference from a wireless network after a sleep mode in a wireless telephone.

BACKGROUND OF THE INVENTION

A tension exists between the diverse goals of minimizing size and weight of a wireless telephone (also called cell phones, mobile stations or mobile telephones) and the amount of time that the wireless telephone may be used without recharging the battery. Generally, the greater the battery capacity, the larger and heavier the battery is. While many advances have been made in battery technology to address this issue, efforts are being made in other areas of wireless telephone technology to conserve battery energy and hence lengthen the useful time of the wireless telephone between recharging.

In direct spread spectrum, code division multiple access (CDMA) wireless technology, there is recognition of a need for battery energy conservation. To this end, the IS95 CDMA standard specifies a "sleep mode" for the wireless telephone, wherein the components that consume the most power are turned off. When the wireless telephone is idle (that is, not on call and not receiving instructions from the wireless system), the wireless telephone is only listening on the paging channel for instructions or a page from the wireless system. Paging messages for a particular wireless telephone can occur from once every 1.28 seconds to once every 163.84 seconds. The wireless telephone can thus turn off the power to many of its components during the other times. This technique provides a very powerful method by which a battery-operated wireless telephone can conserve battery energy when idle.

A problem arises, however, when the components of the wireless telephone come out of the sleep mode. As is known in the art, most wireless communication systems use a centralized time reference to maintain synchronization of modulation and demodulation. Every wireless telephone includes an oscillator as frequency reference and input to a master timer or local system time reference. This oscillator is, in many cases, a temperature-compensated crystal oscillator that maintains precise alignment of the wireless telephone's clock to the system's reference clock. It is desirable to disable (power off) the temperature-compensated crystal oscillator because it uses a relatively large amount of power when active. However, to begin modulating and demodulating signals again, the master timer (local time reference) must be resynchronized to the network time reference when the oscillator is turned back on. One method for resynchronization is to acquire the synchronization channel as in the wireless telephone power-up routine. Such synchronization may take most of the time of the sleep period. In the worst case, acquisition of the synchronization channel may take more power than the master timer requires if it remained powered-on during the sleep period.

This invention is directed to solving one or more of the above-described problems.

SUMMARY OF THE INVENTION

In accordance with one aspect of this invention, a method is disclosed for rapidly reacquiring a timing reference after a sleep period in a wireless telephone receiving pilot signals that have a plurality of parameters from one or more base stations in a wireless network. The wireless telephone has a local time reference (master timer) synchronized to a timing reference in the wireless network, a fast, accurate clock, a slow, less accurate but more power efficient clock and a memory. The method includes the steps of storing one or more of the pilot signals' parameters, calculating predicted parameters of the pilot signals after the sleep period based on the stored parameters, loading the prediction into the master timer, starting the slow clock source, and stopping the master timer (local time reference) and fast clock source. The method further includes the steps of generating a wake-up interrupt by the slow clock after the sleep period, restarting the master timer and fast clock source responsive to the wake-up interrupt, and reacquiring pilot signals. A time correction factor is then computed that closely aligns the received pilot signals with the prediction. The master timer (local time reference) is adjusted by the weighted time correction.

In accordance with a further aspect of this invention, the wireless telephone includes a counter in the slow clock and the step of generating a wake-up interrupt comprises generating the wake-up interrupt when the counter reaches a predetermined number. In accordance with an additional aspect of this invention, one of the pilot signals' parameters is a time offset and the step of storing one or more of the pilot signals' parameters includes storing the time offset.

In accordance with another aspect of this invention, the step of calculating predictions of the pilot signals comprises calculating a prediction of each pilot signal's time offset after the sleep period and further may include weighting the time corrections based on the signal strength of the reacquired pilot signals.

In accordance with another aspect of this invention, the step of weighting the time corrections comprises weighting the time corrections based on the arrival time of each of the reacquired pilot signals, wherein earlier arriving pilot signals are assigned more weight than later arriving pilot signals.

In accordance with a further aspect of this invention, the step of adjusting the master timer comprise averaging the weighted time corrections and adjusting the master timer by advancing or delaying it by the amount of the time correction.

In accordance with another aspect of this invention, the step of calculating predicted parameters of the pilot signals after a sleep period comprises basing the prediction on factors internal to the wireless telephone, wherein the internal factors include the age of the slow clock, the current state of the slow clock's power supply voltage and the temperature of the slow clock.

In accordance with a further aspect of this invention, the step of calculating predicted parameters of the pilot signals after a sleep period comprises basing the predictions on factors external to the wireless telephone, such as movement of the wireless telephone, arrival time of reflective pilot signals and the course of the wireless telephone. In accordance with another aspect of this invention, the wireless telephone's position and course may be measured by a global positioning system or based on the latitude and longitude of the transmitting base stations. In accordance with a further aspect of this invention, the master time measures time in chips and the step of adjusting the master timer comprises advancing or delaying the master timer one chip at a time.

In accordance with a different aspect of this invention, a wireless telephone is disclosed that rapidly reacquires a timing reference after a sleep period wherein the wireless telephone receives pilot signals having a plurality of parameters from one of more base stations in a wireless network. Wireless telephone comprises a slow clock configured to time the sleep period and generate a wakeup interrupt at the end of the sleep period, a master timer configured to provide a timing reference for the wireless telephone and a digital signal processor configured to demodulate the pilot signals using the timing reference and to determine parameters in pilot signals. The wireless telephone further includes a processor which is configured to calculate a prediction of the parameters of the pilot signals after the sleep period based on the parameters determined by the digital signal processor, start the sleep period, end the sleep period responsive to the interrupt, compare parameters of pilot signals delivered by the digital signal processor to the prediction and adjust the master timer to align the timing reference of the master timer to the pilot signals.

In accordance with another aspect of this invention, a wireless telephone further includes a memory for storing a history of parameters of pilot signals and wherein the processor is configured to calculate the prediction of the parameters of the pilot signals after the sleep period based on the parameters determined by the digital signal processor in the history of parameters.

In accordance with a further aspect of this invention, the processor is configured to turn on power to the slow clock prior to the sleep period and turn off power to the slow clock after the sleep period and to turn off power to the master timer at the beginning of the sleep period and turn on power to the master timer at the end of the sleep period.

In accordance with yet another aspect of this invention, the master timer includes a counter and the processor is configured to adjust the master timer by speeding up or slowing down the counter. The wireless telephone further includes a fast timing reference that operates at a multiple of the timing reference and the processor is configured to speed up the master timer by advancing the counter according to the fast timing reference. Further, the processor is configured to adjust the master timer by slowing down the counter by the timing reference.

In accordance with a further aspect of this invention, the wireless telephone may include a global positioning system wherein the processor is configured to determine the position of the wireless telephone and to calculate the prediction of parameter of pilot signals based on the position. Further, the processor can store a plurality of positions over time and base the calculation of the prediction of parameters on the stored plurality of positions.

Therefore, it is an object of this invention to provide a system that can rapidly reacquire the timing synchronization after a sleep mode.

It is another object of this invention to provide a system and method that minimized power consumption while maintaining operability.

It is a further object of this invention to provide a method for rapidly reacquiring the timing synchronization and maximize the sleep period.

BRIEF DESCRIPTION OF THE DRAWINGS

A more complete understanding of this invention may be obtained from a consideration of the following detailed description, in conjunction with the drawings, in which.

DETAILED DESCRIPTION

A sleep mode in a wireless telephone requires that the wireless telephone be able to resynchronize to the wireless network's time as rapidly as possible in order to maximize the benefit of the sleep mode. To this end, a database of internal and external parameters which may affect a slow (but energy efficient) clock is kept. Internal parameters may include such things as the age of the crystal source, battery age, ambient temperature, etc. External parameters include relative movement of the wireless telephone of the present invention to the pilot signals and a relation to geography in general. The wireless telephone predicts the pilot signals' parameters (e.g., time and frequency offset) at the end of the sleep mode and then shuts down or halts a number of internal devices (except for the slow clock and a sleep mode controller). At the end of the sleep mode, the wireless telephone reacquires the pilot signals and resynchronizes the master timer by determining how far off the estimation is from the reacquired current pilot signals.

Figure 1:
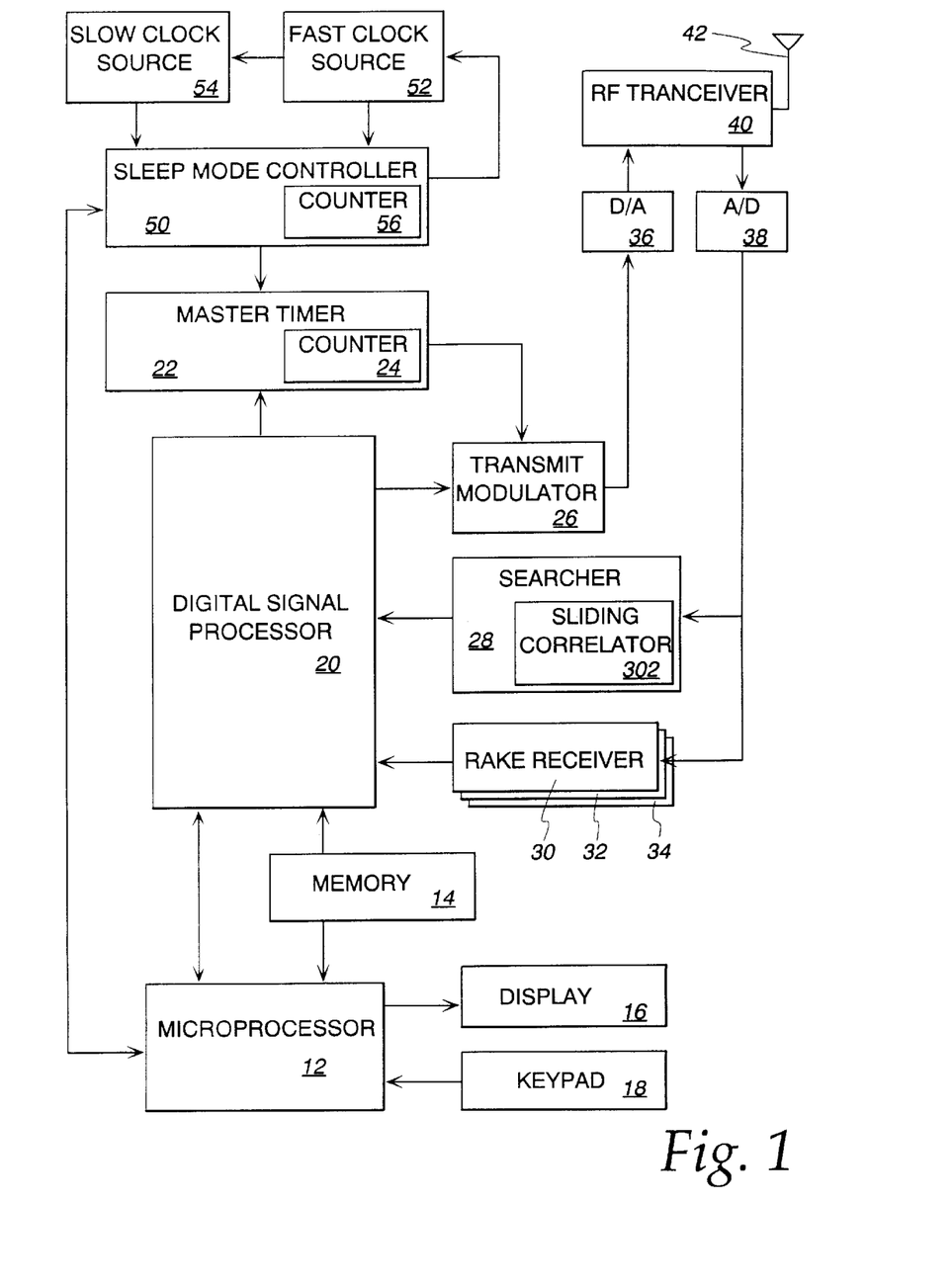
FIG. 1 is a block diagram of a wireless telephone that can rapidly reacquire a timing reference after a sleep mode in accordance with an exemplary embodiment of this invention.

FIG. 1 shows a block diagram of a wireless telephone shown generally at 10. At the heart of the wireless telephone 10 is a microprocessor 12, which coordinates, controls and operates the wireless telephone 10 using programs and data stored in memory 14. Microprocessor 12 also controls a display 16 and a keypad 18 that displays information to the user and receives input from the user, respectively.

A digital signal processor 20 provides a connection between a speaker and a microphone, as are known in the art (not shown here for clarity), and the signal modulation/demodulation portion of the wireless telephone 10. The digital signal processor 20 coordinates its actions with a master timer 22 which, in this exemplary embodiment, includes a temperature-compensated, crystal oscillator. Master timer 22 increments counter 24 in "chips," as is known in the art, as the basic unit of time. A signal from master timer 22 is delivered to a transmit modulator 26, a searcher 28, and rake receivers 30, 32 and 34.

The transmit modulator 26 modulates symbols representing the data on speech to be transmitted prepared by digital signal processor 20 with the known "access code" (derived from the "spreading code," "long code" and other mobile specific parameters) and transmits the resulting signal to the digital to analog converter (D/A) 36. In the opposite direction, an analog to digital converter (A/D) 38 delivers a digital representation of waveforms to searcher receiver 28 and rake receivers 30, 32 and 34. RF transceiver 40 sends and receives analog wave forms between wireless telephone 10 and a wireless network (not shown but well known in the art) over antenna 42.

In a typical RF communication system, a transmitted signal may travel from a transmitter to a receiver over multiple paths, for example, a direct path and also one or more reflected paths. Each path (which may be considered a separate "channel") is subject to the effects of fading, Doppler shift, etc. Moreover, the combination of channels at the receiver can result in additional fading. A CDMA wireless telephone 10 includes more than one rake receiver, illustrated here as three rake receivers 30, 32 and 34, each of which demodulate a received channel. The output of the rake receivers 30, 32 and 34 are constructively combined and delivered to digital signal processor 20. However, in order to constructively combine the signals, the rake receivers 30, 32 and 34 must know the delay of each channel. (Two of the rake receivers are delayed so that all three signals align when combined.) Typically, rake receivers 30, 32 and 34 operate in conjunction with a searcher 28. The searcher 28 analyzes received signals to determine the several delayed versions of the signal of interest. The strongest channels are assigned to the rake receivers 30, 32 and 34 and the two delays are set.

According to this invention, a sleep mode controller 50 operates in conjunction with the microprocessor 12, a fast clock source 52 and a slow clock source 54. The fast clock source 52 operates at a speed faster than the master timer 22, as is known in the art. The slow clock source 54, as will be described further below, includes an oscillator that is slower and less accurate than the oscillator in master timer 22, but is more energy efficient.

Figure 2:
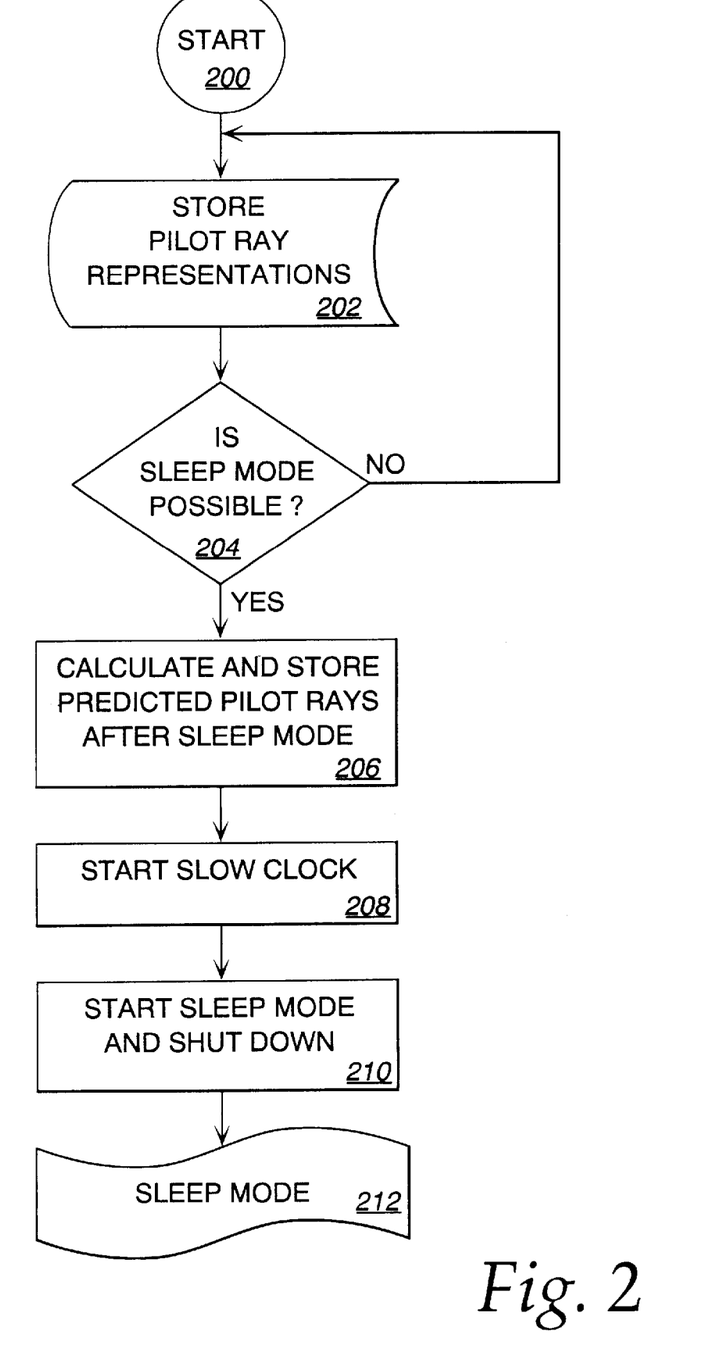
FIG. 2 is a flow chart of operation of the wireless telephone of FIG. 1 prior to the sleep mode.

An exemplary method that operates in the mobile station of FIG. 1 will now be described in connection with the diagrams of FIGS. 2 and 3. Processing starts in circle 200 wherein mobile station 10 is actively demodulating signals, such as pilot signals, from one or more base stations. Processing moves to box 202 where representations of the parameters of the pilot signals (complex vectors describing the pilot signals) are stored in memory 14. Such parameters include, but are not limited to, frequency offset and timing offset. To this end, digital signal processor 20 configures the searcher 28 to perform a correlation search of the pilot signal from the serving base station, pilot signals from surrounding neighbor base stations and any other previously identified pilot signal sets at predefined time offsets. The digital signal processor 20 stores the information in a data base in memory 14. Thus, pilot signal parameters are accumulated that represent the time offset and signal strength of the pilot signals and how the time offset and signal strength change over time. Processing then moves to decision diamond 204 where a determination is made whether a sleep mode is possible. If the sleep mode is not possible (i.e., the mobile station is on a call or is receiving instructions from the base station), then processing returns to box 202.

If the microprocessor 12 determines that the sleep mode is possible in decision diamond 204, then processing proceeds to box 206 where the microprocessor 12 calculates the appropriate wake-up time for the wireless telephone 10. This data is loaded into sleep mode controller 50. In box 206, the digital signal processor 20 calculates and stores a prediction of the pilot signals' parameters after the sleep mode is completed by using the information stored in the database and the length of the sleep mode, and advantageously other data. Such calculations include, but are not limited to, calculating a frequency offset of one or more pilot signals at the end of the sleep period by determining how the frequency offsets and other data will change over the sleep period by extrapolating over the period of time that the master timer will be in the sleep mode. A further calculation may be to determining the timing offset of one or more pilot signals at the end of the sleep period by determining how the timing offset of the pilot signals have changed over time and extrapolating the change of timing offset over the time period of the sleep mode. Similar calculations may be made on other signal parameters.

Other data that can be used in the calculation may include internal factors, including the age of the crystal of the slow clock source 54, current battery age, oscillator's supply voltage, temperature of the unit, and previous calibration results at known voltage/temperature conditions/age. External factors that affect the timing of the pilot signals include movement of the wireless telephone. Further, an approximate position and course for the wireless telephone 10 may be estimated. This estimation may be computed based on an optional Global Positioning System (GPS) receiver (not shown but well known in the art) in the wireless telephone 10 or the change in time of arrival of signals from several sufficiently geographically separated base stations (wherein the base station latitude/longitude is provided in higher level protocol messaging, as is known in the art). The course and speed can further be used to refine the prediction because the signals from base stations that the wireless telephone 10 is heading towards arrives earlier in time and signals from base stations that the wireless telephone 10 is heading away from arrive later.

Processing moves to action box 208 where the microprocessor 12 starts the slow clock 54 and enables the slow clock 54 to time the sleep controller 50. A counter 56 is incremented by slow clock 54 at its oscillation rate, as known in the art. Microprocessor 12 then loads the wake-up time into the sleep controller 50. The microprocessor 12 also loads the prediction into the master timer 22 (to be used at wake-up) and then turns off the master timer 22. Microprocessor 12, in action box 210, turns off the power to the fast clock source 54. Microprocessor 12 then halts to wait for the wake-up interrupt. In block 212, the mobile station 10 is in sleep mode. Thus, only the slow clock source 54 and the counter 56 in the sleep mode controller 50 are powered and active in sleep mode.

Figure 3:
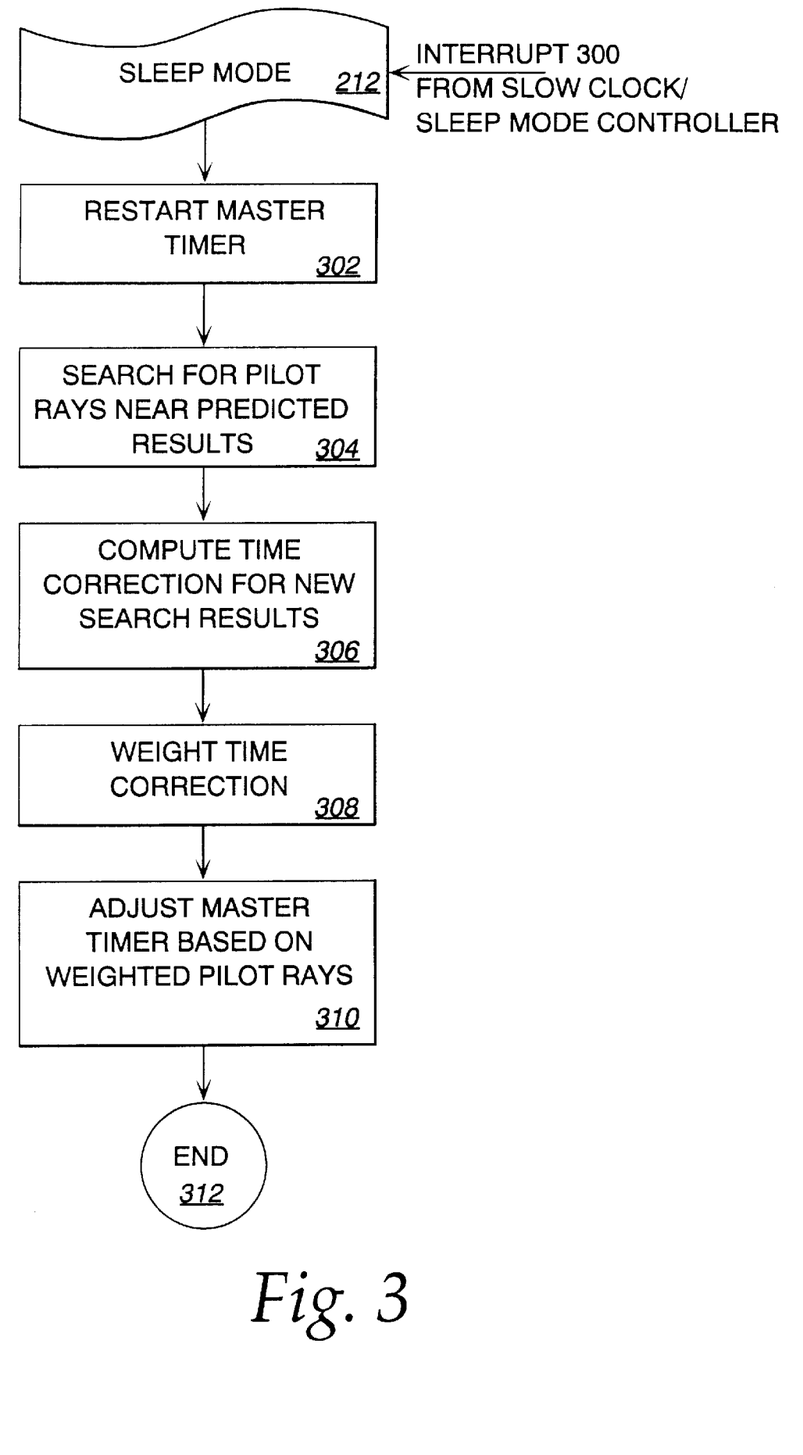
FIG. 3 is the operation of the wireless telephone of FIG. 1 after the sleep mode.

Turning now to FIG. 3, processing after wake-up from the sleep mode 212 is described. After the timer has expired (the counter 56 in the sleep mode controller 22 has reached a predetermined number), processing moves from sleep mode 212 when an interrupt 300 arrives at the microprocessor 12 from the sleep mode controller 50. Processing moves to action box 302 where the microprocessor 12 restarts the master timer 22. Processor 12 also restarts searcher 28, rake receivers 30, 32 and 34, digital signal processor 20, and any other components that were powered down or halted during the sleep mode. The fast clock source 52 is switched into the place of the slow clock source 54. The parameters in CDMA that need to be reinitialized (i.e., the parameters that depend upon the master timer 22) include the state of the quadrature spreading sequence (short pseudo-noise code), the state of the long pseudo-noise code, frame timing and timing associated with the wireless telephone's rake receiver demodulation components. Processing moves to action box 304 where the microprocessor 12 initiates a search by configuring the searcher 28 to perform a search to reacquire the pilot signals using the previously-stored parameters, and restarted master timer 22.

Figure 4:
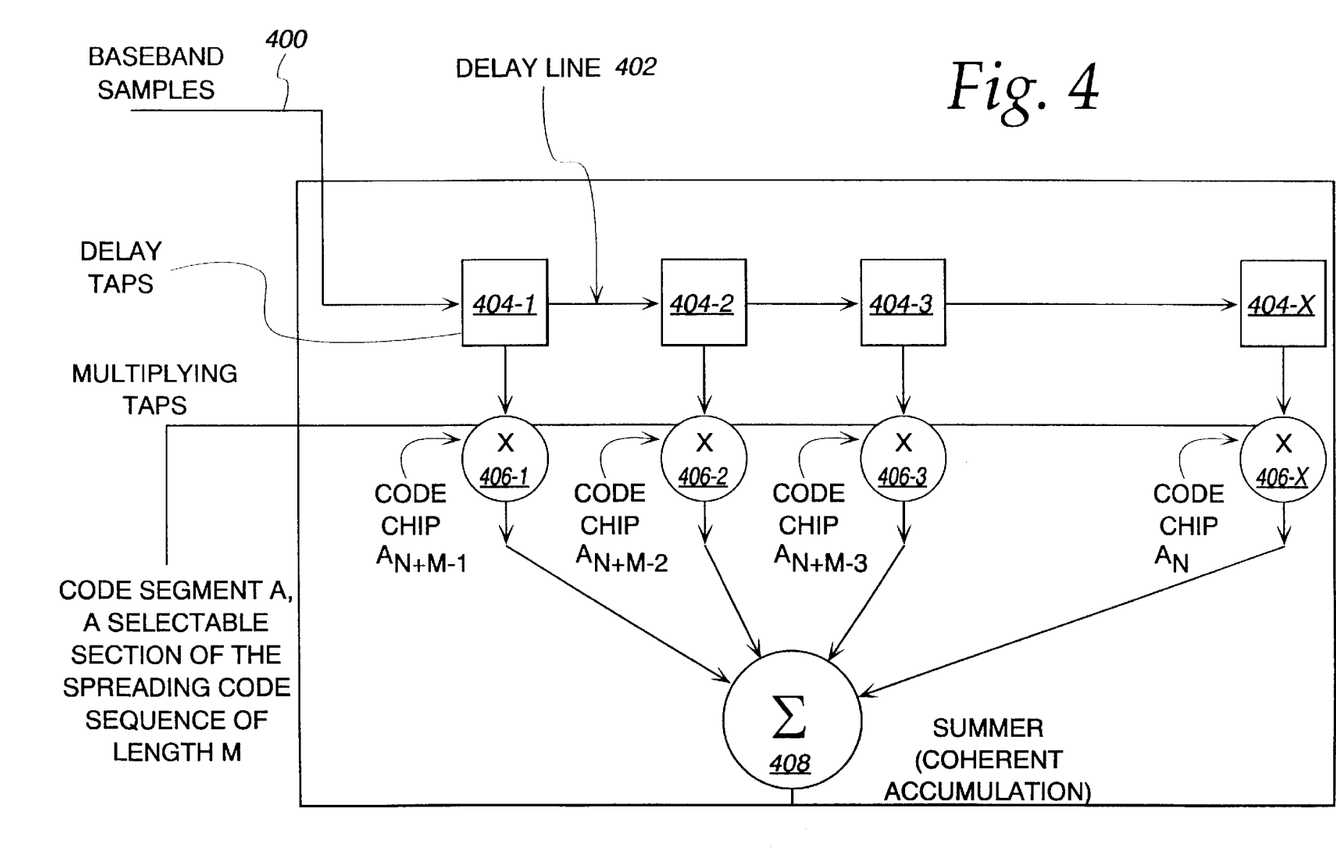
FIG. 4 is an exemplary sliding correlator of FIG. 1.

Processing continues to action box 306 where, for each reacquired pilot signal, the digital signal processor 20 computes a time correction that most likely aligns the reacquired pilot signal with the prediction. Processing moves to box 308 where, for each reacquired pilot signal, the digital signal processor 20 weights the computed time correction based on the signal strength of the reacquired pilot signal, its position in time (earlier weighted heavier than later), previous stability of the slow clock 54 and consistency of the position of the wireless telephone 10 by biasing the correction in favor of stronger signal, stable clock, etc. Processing moves to action box 310 where the digital signal processor 20 averages the weighted time corrections and adjusts the master timer 22 by the weighted average time correction by advancing or delaying the timer in a chip-wise fashion. Advantageously, such calculation of boxes 306 and 308 may use a sliding correlator 302, as shown in FIG. 4. Processing ends in circle 312 where the wireless telephone 10 is again actively demodulating the pilot and access channels.

The sliding correlator 302 of FIG. 4 takes newly received baseband signal samples on line 400 and applies the signal samples to a delay line 402 as known in the art. Delay taps 404-1–404-X tap the baseband samples at various points on delay line 402. These samples are then multiplied in multiplying taps 406-1–406-X with the predicted segment of, for example, the long code. The products of multiplying taps are added at summer 408 to generate a correlation. The rate at which the long code is multiplied may be advanced or retarded, and the master time is synchronized at the time of the greatest correlation results.

Figure 5:
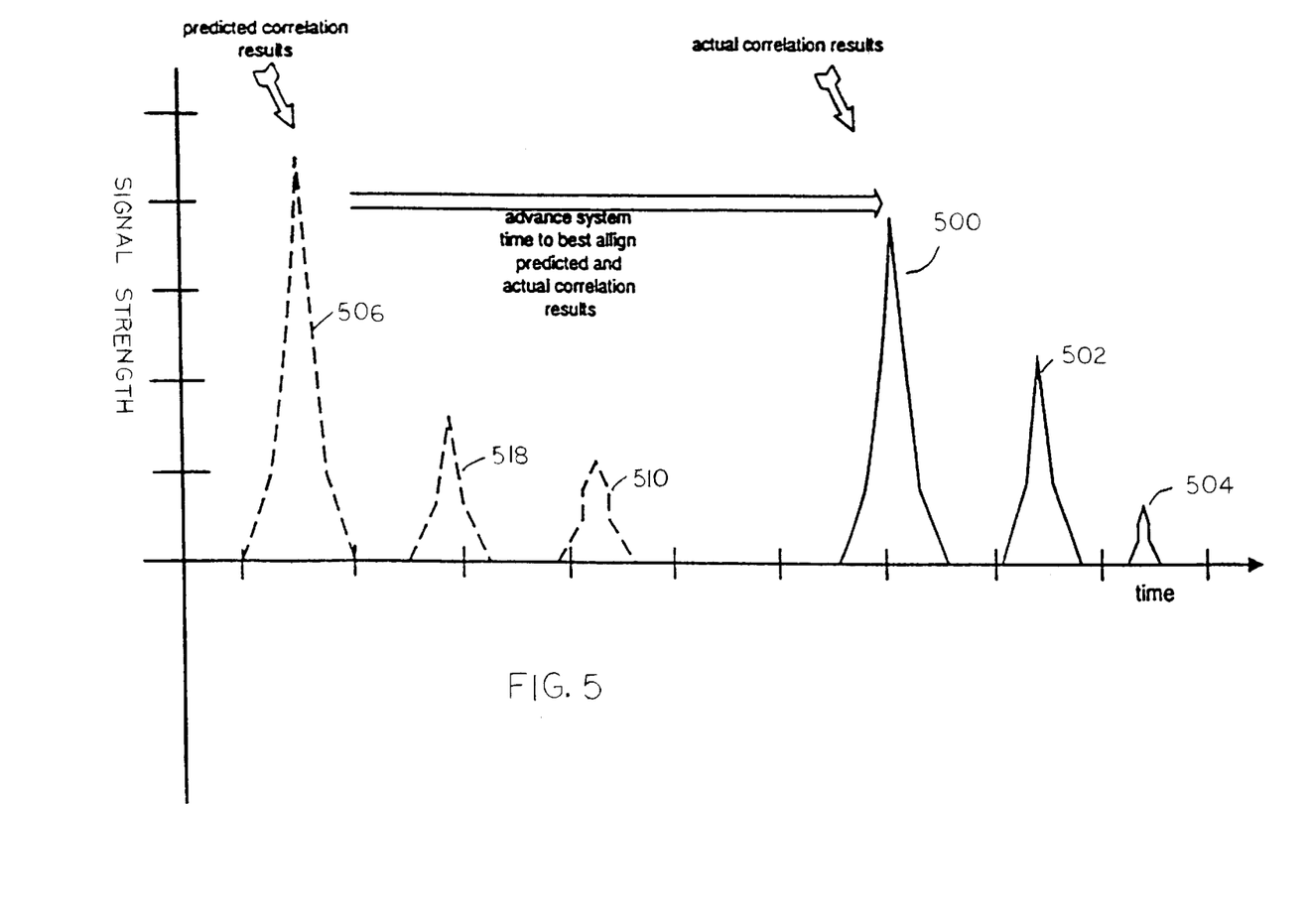
FIG. 5 is an example of predicted correlation results versus actual correlation results in reacquiring the timing reference.

Turning now to FIG. 5, a graph of signal strength versus time is shown. When the system comes out of the sleep mode, it discovers pilot signals at positions 500, 502 and 504. As illustrated in this example, the predicted correlation results 506, 508 and 510 are behind in time to the search results (from searcher receiver 28). Also, the newly acquired pilot signals do not match the predicted parameters of the pilot signals (i.e., shape, magnitude of the signal strength, etc.). This reflects the reality that the signals are constantly changing in relation to the wireless telephone 10. In the scenario of FIG. 5, the timing prediction is corrected by advancing the system time until the actual correlation best matches the prediction. In this exemplary embodiment, it is preferable that the prediction be behind the true system time after the sleep mode. The rate at which the time can be advanced is a function of the fastest clock (fast clock 52, FIG. 1). If the fast clock 52 is operating at twelve time the rate of the master timer 22, then the time can be adjusted twelve times as fast. If the hypothesis is ahead of system time, correction can only occur at a rate of one chip per chip period.

It is therefore apparent that this invention provides a system that maximizes the idle mode powered-down time. By predicting pilot signals at the end of the sleep period, the system can load these predictions and then search rapidly to correlate the predictions to the newly observed pilot data. The master timer can then be advanced or retarded, depending on the observed pilot signals. It is to be understood that many variations may be devised by those skilled in the art without departing from the scope of this invention. It is intended that such variations be included within the scope of the appended claims.

What is claimed is:

1. In a wireless telephone receiving pilot signals having a plurality of parameters from one or more base stations in a wireless network, said wireless telephone having a master timer synchronized to a timing reference in the wireless network, a slow clock, a processor and a memory, a method for rapidly reacquiring the timing reference after the master timer emerges from a sleep period, said method comprising:
   storing one or more of the pilot signals' parameters over time;
   calculating predicted parameters of the pilot signals after the sleep period based on the stored parameters;
   turning off power to the master timer and halting the processor;
   generating a wake-up interrupt responsive to the slow clock after the sleep period;
   turning power on to the master timer responsive to the wake-up interrupt;
   reacquiring the pilot signals having a plurality of parameters from one or more base stations;
   computing a time correction that most likely aligns the parameters of the received pilot signals and the predicted parameters; and
   adjusting the master timer by the time correction.

2. The method of claim 1 further including the steps of turning on power to the slow clock before turning off power to the master timer and turning off power to the slow clock after turning on power to the master timer.

3. The method of claim 1 wherein the step of computing a time correction includes weighting ones of the time corrections of the received pilot signals in the computation, and wherein the master timer is adjusted by the weighted time correction.

4. The method of claim 1 wherein the slow clock increments a counter and wherein the sleep period ends when the counter reaches a predetermined number.

5. The method of claim 1 wherein one of the parameters of each pilot signal is a time offset, and wherein the step of storing one or more parameters includes storing the time offsets.

6. The method of claim 5 wherein the step of calculating a prediction of the pilot signals' parameters comprise calculating a prediction of each pilot signals' time offset after the sleep period.

7. The method of claim 3 wherein one of the pilot signals' parameters comprises signal strength and wherein said step of weighting the time corrections comprises weighting the time corrections based on the signal strength of the pilot signals.

8. The method of claim 3 wherein said step of weighting the time corrections is based on the arrival time of each reacquired pilot signal.

9. The method of claim 8 wherein earlier arriving reacquired pilot signals are assigned more weight than later arriving reacquired pilot signals.

10. The method of claim 3 wherein the master timer increments a counter and the step of adjusting the master timer comprises averaging the weighted time corrections and adjusting the timing increments of the counter based on the average.

11. The method of claim 1 wherein the step of calculating a prediction of the pilot signals after a sleep period uses factors internal to the wireless telephone that affect the accuracy of the predicted parameters.

12. The method of claim 11 wherein the internal factors include the age of the slow clock.

13. The method of claim 11 wherein the internal factors include the current state of the slow clock power supply voltage.

14. The method of claim 11 wherein the internal factors include the temperature of the slow clock.

15. The method of claim 11 wherein the internal factors include previous calibration results at known voltage, temperature and age conditions of the slow clock.

16. The method of claim 1 wherein the step of calculating a prediction of the parameters after a sleep period includes using factors external to the wireless telephone that affect the accuracy of the predicted parameters.

17. The method of claim 16 wherein the external factors include movement of wireless telephone.

18. The method of claim 16 wherein the external factors include the arrival time of reflected pilot signals.

19. The method of claim 16 wherein the external factors include the position and course of the wireless telephone.

20. The method of claim 19 wherein the wireless telephone includes a global positioning system and the position and course of the wireless telephone is calculated by the global positioning system.

21. The method of claim 19 wherein the parameters of the pilot signals include the latitude and longitude of the base station, and the position and course of the wireless telephone is based on the change in time of arrival of the pilot signals from several base stations.

22. The method of claim 1 wherein the master timer measures time in chips and the step of adjusting the master timer comprises advancing or delaying the master timer in one chip increments.

23. A wireless telephone that rapidly reacquires a timing reference after a sleep period, said wireless telephone receiving pilot signals having a plurality of parameters from one or more base stations in a wireless network, said wireless telephone comprising:
   a sleep controller configured to time the sleep period and generate a wake up interrupt at the end of the sleep period;
   a master timer configured to provide a timing reference for the wireless telephone;
   a demodulator configured to demodulate the pilot signals using the timing reference and to determine parameters of the pilot signals; and
   a processor configured to:
      (a) calculate a prediction of the parameters of the pilot signals after the sleep period based on the parameters determined by the digital signal processor,
      (b) start the sleep period,
      (c) end the sleep period responsive to the interrupt,
      (d) compare parameters of pilot signals to the prediction, and
      (e) adjust the master timer to align the timing reference of the master timer to the pilot signals.

24. The wireless telephone of claim 23 further comprising a memory for storing a history of the parameters of pilot signals.

25. The wireless telephone of claim 24 wherein the processor is further configured to calculate a prediction of the parameters of the pilot signals after the sleep period based on the parameters determined by the digital signal processor and the history of parameters.

26. The mobile station of claim 23 wherein the processor is further configured to turn on power to the slow clock prior to the sleep period and turn off power to the slow clock after the sleep period.

27. The mobile station of claim 23 wherein the sleep controller includes a counter, said sleep controller being configured to generate the interrupt responsive to the counter reaching a predetermined number.

28. The mobile station of claim 27 further including a slow clock connected to the sleep controller that increments the counter.

29. The mobile station of claim 28 further comprising a fast timing reference that operates at a multiple of the timing reference, said processor being configured to speed up the master timer by advancing the master timer according to the fast timing reference.

30. The mobile station of claim 28 wherein the processor is configured to adjust the master timer by slowing the master timer.

31. The mobile station of claim 23 further comprising a global positioning system, wherein said processor is configured to determine a position of the mobile station and is further configured to calculate the prediction of the parameters of the pilot signals based on the position.

32. The mobile station of claim 31 wherein said processor is configured to determine a plurality of positions over time and store the plurality of positions and wherein the processor is further configured to calculate the prediction of the parameters of the pilot signals based on the stored plurality of positions.

33. The mobile station of claim 23 wherein the processor is further configured to turn off power to the master timer at the beginning of the sleep period, and to turn on power to the master timer responsive to the interrupt at the end of the sleep period.

* * * * *